US008428393B2

(12) United States Patent
Kraft

(10) Patent No.: US 8,428,393 B2
(45) Date of Patent: Apr. 23, 2013

(54) SYSTEM AND METHOD OF NON-LINEAR GRID FITTING AND COORDINATE SYSTEM MAPPING

(75) Inventor: Raymond H. Kraft, Seattle, WA (US)

(73) Assignee: Rudolph Technologies, Inc., Flanders, NJ (US)

( * ) Notice: Subject to any disclaimer, the term of this patent is extended or adjusted under 35 U.S.C. 154(b) by 932 days.

(21) Appl. No.: 10/800,420

(22) Filed: Mar. 12, 2004

(65) Prior Publication Data

US 2004/0223661 A1 Nov. 11, 2004

Related U.S. Application Data

(60) Provisional application No. 60/454,581, filed on Mar. 14, 2003.

(51) Int. Cl.
*G06K 9/36* (2006.01)

(52) U.S. Cl.
USPC .......... 382/287; 382/291

(58) Field of Classification Search .......... 382/287, 382/291, 294
See application file for complete search history.

(56) References Cited

U.S. PATENT DOCUMENTS

| | | | | |
|---|---|---|---|---|
| 4,467,211 | A * | 8/1984 | Smith et al. | 250/492.2 |
| 5,020,123 | A * | 5/1991 | Thompson | 382/175 |
| 5,091,972 | A * | 2/1992 | Kwon et al. | 382/277 |
| 5,768,443 | A * | 6/1998 | Michael et al. | 382/294 |
| 6,178,272 | B1 * | 1/2001 | Segman | 382/298 |
| 6,340,114 | B1 * | 1/2002 | Correa et al. | 235/462.22 |
| 6,538,691 | B1 * | 3/2003 | Macy et al. | 348/222.1 |
| 6,618,494 | B1 * | 9/2003 | Nonay et al. | 382/132 |
| 7,034,272 | B1 * | 4/2006 | Leonard et al. | 250/208.1 |
| 2005/0089213 | A1 * | 4/2005 | Geng | 382/154 |

OTHER PUBLICATIONS

Brandle et al.,"Automatic Grid Fitting for Genetic Spot Array Images Containing Guide Spots," Spetmeber 1999, Springer Verlag, pp. 357-366.*

Qi, Fei; Chengying Hua, "Efficient automated microarray image analysis" Second International Conference on Image and Graphics, SPIE vol. 4875 (2002) pp. 567-574.

Schattenburg, M. L., C. Chen, P. N. Everett, J. Ferrera, P. Konkola, and H. I. Smith, "Sub-100 nm metrology using interferometrically produced fiducials" J. VAc. Sci. Technol. B 17(6), Nov./Dec. 1999, pp. 2692-2697.

Brandle, Norbert, H. Lapp, and H. Bischof, "Automatic Grid Fitting for Genetic Spot Array Images Containing Guide Spots" Lecture Notes in Computer Science, Springer Verlag, New York, NY, US, vol. 1689, Sep. 1999 pp. 357-366.

* cited by examiner

*Primary Examiner* — John Strege

(74) *Attorney, Agent, or Firm* — Dicke, Billig & Czaja, PLLC

(57) ABSTRACT

A system and method of non-linear grid fitting and coordinate system mapping may employ data processing techniques for fitting a set of measured fiducial data to an ideal set of fiducials; the fiducials may be arranged in a known (e.g., Cartesian grid) pattern on a substrate imaged by an imaging apparatus. Exemplary embodiments may model the non-linear transformation to and from imaged coordinates (i.e., coordinates derived from acquired image data) and artifact coordinates on the fiducial plate (i.e., actual coordinates of the fiducial relative to a reference point on the fiducial plate).

24 Claims, 3 Drawing Sheets

SYSTEM AND METHOD OF NON-LINEAR GRID FITTING AND COORDINATE SYSTEM MAPPING

CROSS-REFERENCE TO RELATED APPLICATIONS

The present application claims the benefit of U.S. provisional application Ser. No. 60/454,581, filed Mar. 14, 2003, entitled "AN APPROACH FOR NONLINEAR GRID FITTING AND COORDINATE SYSTEM MAPPING," the disclosure of which is hereby incorporated herein by reference in its entirety.

FIELD OF THE INVENTION

Aspects of the present invention relate generally to coordinate system mapping applications, and more particularly to a system and method of non-linear grid fitting and coordinate system mapping for image acquisition and data processing applications.

BACKGROUND OF THE INVENTION

In many conventional image acquisition and image data processing systems, feature geometry of a known, highly accurate artifact may become distorted during imaging, data processing, or both. One such situation may arise where a precision Cartesian grid (or array) of points printed on glass or other substrate material is imaged using optics and a camera, such as a charge-coupled device (CCD) camera, for example, or a complementary metal-oxide semiconductor (CMOS) imaging device. Such artifact features may be referred to as fiducials, and the foregoing substrate having a known pattern of fiducials printed thereon, or incorporated into the structure thereof, may be referred to as a fiducial plate.

FIG. 1 is a simplified diagram illustrating raw image data acquired by an imaging apparatus and representing a top view of a precision Cartesian grid of fiducials printed on a fiducial plate. Image acquisition of such fiducial plates and fiducial arrays may have utility in various contexts such as semiconductor probe card testing processes, for example, calibration of high-resolution imaging apparatus, and other imaging applications requiring a high degree of accuracy.

Given a precision artifact such as a fiducial or a fiducial array or grid to be imaged, conventional technology is deficient to the extent that it lacks the ability to identify the non-linear transformation to and from imaged coordinates (i.e., coordinates derived from acquired image data) and artifact coordinates on the fiducial plate (i.e., actual coordinates of the fiducial relative to a reference point on the fiducial plate).

Specifically, in an acquired image (i.e., image data obtained by a camera or other imaging hardware), the respective location of the center of each respective fiducial may be extracted from the acquired image data. In the case where the fiducial plate carries a Cartesian grid of fiducials, ideally, the fiducial locations in the acquired image form a regular, known rectangular grid aligned, for example, with the axes of the camera or other imaging apparatus. Due to factors such as fiducial absence, stage rotations, camera rotations, pixel size variation, magnification variation, keystone/barrel distortion, and other optical or mechanical effects, the measured fiducial locations may deviate from the ideal regular rectangular grid (e.g., as it exists on the Cartesian array of the fiducial plate).

SUMMARY

Aspects of the present invention overcome the foregoing and other shortcomings of conventional technology, providing a system and method of non-linear grid fitting and coordinate system mapping for image acquisition and data processing applications. Exemplary embodiments may model the non-linear transformation to and from imaged coordinates (i.e., coordinates derived from acquired image data) and artifact coordinates on the fiducial plate (i.e., actual coordinates of the fiducial relative to a reference point on the fiducial plate).

In accordance with one exemplary embodiment, a method of fitting acquired fiducial data to a set of fiducials on a fiducial plate may comprise: fitting a fiducial grid model to data acquired by an imaging apparatus; establishing a conversion from acquired coordinates to ideal fiducial coordinates; and calculating an absolute location of identified acquired image feature centers in fiducial plate coordinates. As set forth in more detail below, the fitting operation may comprise identifying fiducial coordinates for each fiducial captured in the data acquired by the imaging apparatus.

Additionally, some disclosed methods may further comprise selectively iterating the identifying coordinates for each fiducial and the calculating an absolute location of identified acquired image feature centers.

In accordance with one embodiment of such a method, the calculating comprises utilizing a linear least squares operation. Additional exemplary embodiments may comprise assuming that a rotation of the imaging apparatus relative to a fiducial grid is negligible.

Embodiments are described wherein the imaging apparatus comprises a charge-coupled device camera, a complementary metal-oxide semiconductor device, or similar imaging hardware.

In another exemplary embodiment, a method of accurately measuring a location of a feature relative to a known set of fiducials comprises: acquiring image data; responsive to the acquiring, representing a location of a fiducial in a local fiducial space coordinate system; and mapping a coordinate in the local fiducial space coordinate system to a corresponding location in an image apparatus space. As set forth in detail below, the mapping operation in some embodiments comprises employing a polynomial fit in terms of fiducial coordinates; such employing comprises utilizing a second order polynomial fit, a third order polynomial fit, or some other suitable function.

In accordance with another aspect, a method of fitting a set of measured fiducial data to an ideal set of fiducials, where the fiducials are arranged in a Cartesian grid pattern on a substantially transparent substrate, comprises: acquiring the measured fiducial data employing an imaging apparatus; responsive to the acquiring, representing a location of a fiducial in a local fiducial space coordinate system; and mapping a coordinate in the local fiducial space coordinate system to a corresponding location in a space associated with the image apparatus. As with the method identified above, the mapping in some embodiments may comprise employing a polynomial fit in terms of fiducial coordinates. Such a polynomial fit may be second order, third order, or higher order, for example.

In accordance with another aspect of the disclosed subject matter, a computer readable medium may be encoded with data and instructions for fitting acquired fiducial data to a set of fiducials on a fiducial plate; the data and instructions may cause an apparatus executing the instructions to: fit a fiducial grid model to data acquired by an imaging apparatus; establish a conversion from acquired coordinates of each identified fiducial to ideal fiducial coordinates; and calculate an absolute location of identified acquired image feature centers in fiducial plate coordinates.

As set forth in more detail below, the computer readable medium may be further encoded with data and instructions for causing an apparatus executing the instructions to identify fiducial coordinates for each fiducial captured in the data acquired by the imaging apparatus. In accordance with some embodiments, the computer readable medium may further cause an apparatus executing the instructions selectively to iterate identifying coordinates for each fiducial and calculating an absolute location of identified acquired image feature centers.

The computer readable medium may further cause an apparatus executing the instructions to utilize a linear least squares operation or similar statistical fitting function. Additionally, some disclosed embodiments of a computer readable medium cause an apparatus executing the instructions to assume that a rotation of the imaging apparatus relative to a fiducial grid is negligible.

The foregoing and other aspects of the disclosed embodiments will be more fully understood through examination of the following detailed description thereof in conjunction with the drawing figures.

DETAILED DESCRIPTION

Figure 1:
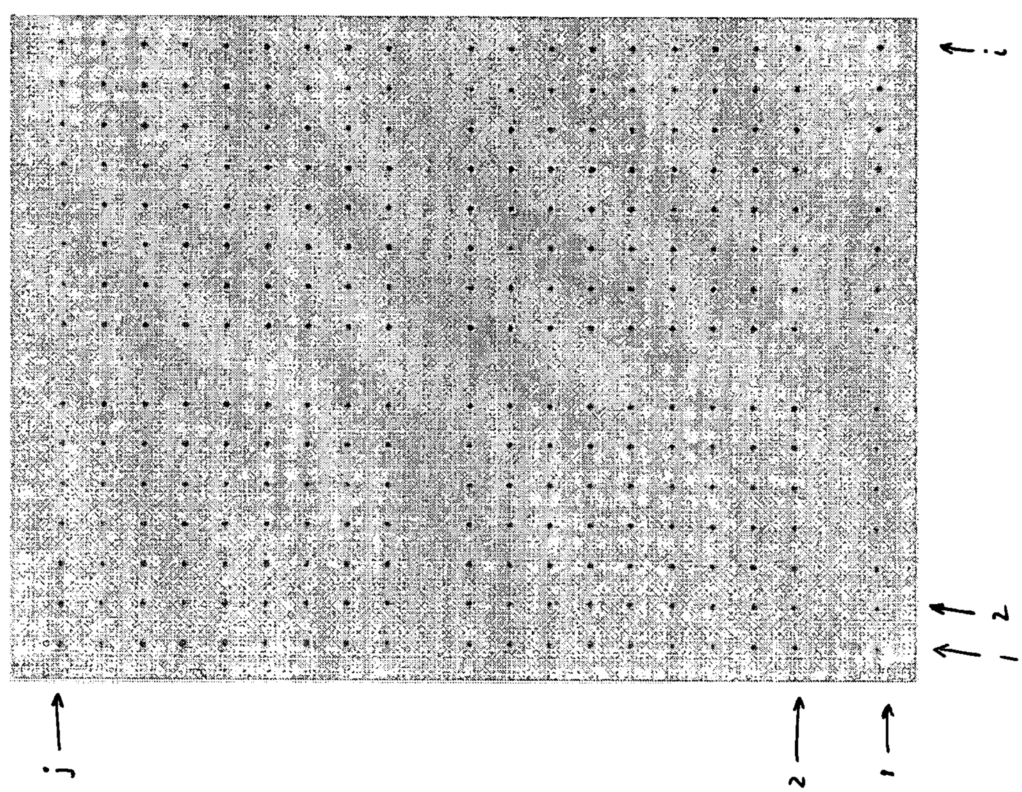
FIG. 1 is a simplified diagram illustrating raw image data acquired by an imaging apparatus and representing a top view of a precision Cartesian grid of fiducials printed on a fiducial plate.

By way of background, it is noted that if the number of fiducials in a given field of view (i.e., area of a fiducial plate imaged by an imaging apparatus) is large, fiducial location measurement noise may be reduced by optimally fitting the acquired image data to a fiducial grid model, and by using the resulting identified model significantly to improve measurement accuracy relative to interpolation from a single fiducial or from a small set of fiducials. One exemplary approach described herein generally involves fitting a fiducial grid model to measured (i.e., "acquired") data, establishing a conversion from camera (i.e., "acquired") coordinates to ideal fiducial coordinates, and calculating the absolute location of identified camera image feature centers in fiducial plate coordinates.

It will be appreciated that the term "camera" in this context, and as used generally herein, is intended to encompass various imaging apparatus including, but not limited to, conventional optical cameras, digital cameras which may be embodied in or comprise charge-coupled device (CCD) or complementary metal-oxide semiconductor (CMOS) device hardware and attendant electronics, and other optical or imaging hardware. These devices may comprise, or be implemented in conjunction with, various optical components such as lenses, mirrors, reflective or refractive grates, and the like, which may be configured and generally operative to achieve desired focal lengths, for example, or other operational characteristics.

In accordance with one aspect of the present invention, fiducial movement may be tracked and a global coordinate reference may be maintained as the camera or imaging apparatus is translated from one location to another across a plane parallel to that of the fiducial plate. In that regard, and considering stage movement errors inherent in many mechanical or electromechanical systems, an algorithm such as those set forth in more detail below may rely upon stage error between discrete moves of less than or equal to half the center-to-center fiducial spacing (as measured on the fiducial plate). Mechanical stage movement errors larger than this may result in position measurement errors that are integer multiples of the fiducial spacing.

Fiducial Grid Model

In a given frame of acquired image data (i.e., data acquired by an imaging device, or "camera," in a single imaging operation), the number of acquired fiducial locations may be represented by a variable, $n_f$. The x and y locations of the $k^{th}$ fiducial center, in camera pixel coordinates, may then be represented by $(x_{cpfk}, y_{cpfk})$ where $k=1, 2, \ldots, n_f$. A particular fiducial, k, may be identified by its column, $i_{pfk}$, and row, $j_{pfk}$, relative to the origin of frame F at point S. Each coordinate in this local fiducial space reference frame $(i_{pfk}, j_{pfk})$ may be mapped to a corresponding location in the camera space $(x_{cpfk}, y_{cpfk})$. One exemplary approach for mapping local frame fiducial coordinates $(i_{pfk}, j_{pfk})$ to camera coordinates $(x_{ck}, y_{ck})$ may employ a polynomial fit in terms of fiducial coordinates as set forth below. Assuming a third order fit, the model may be expressed as:

$$x_{cp_{fk}}=x_0+z_1 i_{p_{fk}}+z_3 j_{p_{fk}}+z_5 i_{p_{fk}}^2+z_6 i_{p_{fk}} j_{p_{fk}}+z_7 j_{p_{fk}}^2+z_{11} i_{p_{fk}}^3+ z_{12} i_{p_{fk}}^2 j_{p_{fk}}+z_{13} i_{p_{fk}} j_{p_{fk}}^2+z_{14} j_{p_{fk}}^3 \quad (1)$$

$$y_{cp_{fk}}=y_0+z_4 i_{p_{fk}}+z_2 j_{p_{fk}}+z_8 i_{p_{fk}}^2+z_9 i_{p_{fk}} j_{p_{fk}}+z_{10} j_{p_{fk}}^2+z_{15} i_{p_{fk}}^3+ z_{16} i_{p_{fk}}^2 j_{p_{fk}}+z_{17} i_{p_{fk}} j_{p_{fk}}^2+z_{18} j_{p_{fk}}^3. \quad (2)$$

The third order form of the foregoing model may be sufficient to capture or otherwise to quantify the following effects: 1) independent scale factors in the x and y directions (these scale factors may be due to a number of sources such as magnification and pixel size variation, for example, among other factors); 2) rotations about the z axis (optical axis); 3) orthogonality errors in the camera pixel arrangement; and 4) keystone distortion caused by skewed viewing angle.

The exemplary model may also adapt to or otherwise effectively account for other sources of image distortion, but may not capture these other effects exactly. If necessary or desired, fitting accuracy may be improved by selectively increasing the order of the polynomial fit. Using Equations (1) and (2), for example, it is possible to map coordinates in fiducial space to coordinates in camera pixel space, and vice-versa. The reverse mapping operation may require solving two non-linear equations in two unknowns, as is set forth in more detail below. The coordinates in fiducial space $(i_p, j_p)$ may be integer valued corresponding to actual fiducial locations $((i_{pf}, j_{pf})\rightarrow(x_{cpf}, y_{cpf}))$, or may be real valued corresponding to general camera pixel locations $((i_p, j_p)\rightarrow(x_{cp}, y_{cp}))$.

Fiducial Grid Model Fitting

Fitting the measured camera frame fiducial locations $(x_{cpfk}, y_{cpfk})$ to the fiducial model of Equations (1) and (2) may initially involve identifying the fiducial coordinates (integer row and column locations $(i_{pfk}, j_{pfk})$) of all fiducials in the acquired image data frame. Since the grid of fiducials may have voids, for example, due to missing or occluded fiducials, a fully populated grid of fiducial coordinates (e.g., a full fiducial array) need not be assumed. One way to identify the fiducial coordinates of the measured fiducials is to use a simplified version of Equations (1) and (2) that includes only linear terms:

$$x_{cpfk}-x_0=z_1 i_{pfk}+z_3 j_{pfk} \tag{3}$$

$$y_{cpfk}-y_0=z_4 i_{pfk}+z_2 j_{pfk}. \tag{4}$$

It may be convenient to set quantities $x_0$ and $y_0$ to the pixel coordinates of an identified fiducial near the center of the field of view. For a known fiducial pitch ($\Delta_{xfid}$, $\Delta_{yfid}$), estimated camera magnification (M), and camera pixel dimensions ($w_{pix}$, $h_{pix}$) inter-fiducial spacing in camera pixel coordinates may be estimated. Given an estimate of total camera rotation relative to the fiducial grid ($\theta_t$), the parameters $z_1$, $z_3$, $z_4$, and $z_2$ may be set as follows:

$$\Delta_{x_{nom}} \triangleq \frac{M\Delta_{x_{fid}}}{w_{pix}} \tag{5}$$

$$\Delta_{y_{nom}} \triangleq \frac{M\Delta_{y_{fid}}}{h_{pix}} \tag{6}$$

$$z_1=\Delta_{x_{nom}}\cos(\theta_t) \tag{7}$$

$$z_3=\Delta_{y_{nom}}\sin(\theta_t) \tag{8}$$

$$z_4=-\Delta_{x_{nom}}\sin(\theta_t) \tag{9}$$

$$z_2=\Delta_{y_{nom}}\cos(\theta_t) \tag{10}$$

With sufficiently accurate alignment characteristics enabled by present mechanical systems, control components, and electronics, it may be reasonable to assume $\theta_t=0$. It will be appreciated by those of skill in the art that, given a reasonable estimate of $x_0$, $y_0$, $z_1$, $z_3$, $z_4$ and $z_2$, Equations (3) and (4) may be solved for fiducial coordinates $i_{pfk}$ and $j_{pfk}$. In that regard, $A_{init}$ and $y_{init}$ may be defined as follows:

$$A_{init}=\begin{bmatrix} z_1 & z_3 \\ z_4 & z_2 \end{bmatrix} \tag{11}$$

$$y_{init}=\begin{bmatrix} x_{cp_{fk}}-x_0 \\ y_{cp_{fk}}-y_0 \end{bmatrix}. \tag{12}$$

Then, from Equations (3) through (12):

$$\begin{bmatrix} i_p \\ j_p \end{bmatrix} = A_{init}^{-1} y_{init} \tag{13}$$

$$i_{pfk}=\text{round}(i_p) \tag{14}$$

$$j_{pfk}=\text{round}(j_p). \tag{15}$$

where the "round" function rounds the argument to the nearest integer.

Now with an estimate of the locations of the fiducials in fiducial coordinates (the row and column number of the measured fiducials) given by Equations (14) and (15), it is possible to return to the third order model and to solve for the unknown parameters using, for example, a linear least squares method. Equations (1) and (2) may be recast into matrix form via:

$$A \triangleq \begin{bmatrix} A0_1 & A1_1 & A2_1 & A3_1 \\ A0_2 & A1_2 & A2_2 & A3_2 \\ \vdots & \vdots & \vdots & \vdots \\ A0_n & A1_n & A2_n & A3_n \end{bmatrix} \tag{16}$$

$$y \triangleq \begin{bmatrix} x_{cp_{f1}} \\ y_{cp_{f1}} \\ x_{cp_{f2}} \\ y_{cp_{f2}} \\ \vdots \\ x_{cp_{fn_f}} \\ y_{cp_{fn_f}} \end{bmatrix} \quad p \triangleq \begin{bmatrix} x_0 \\ y_0 \\ z_1 \\ z_3 \\ \vdots \\ z_{10} \end{bmatrix} \tag{17}$$

$$y=Ap \tag{18}$$

where $$A0_i=\begin{bmatrix} 1 & 0 \\ 0 & 1 \end{bmatrix} \tag{19}$$

$$A1_i=\begin{bmatrix} i_{pfi} & 0 & j_{pfi} & 0 \\ 0 & j_{pfi} & 0 & i_{pfi} \end{bmatrix} \tag{20}$$

$$A2_i=\begin{bmatrix} i_{pfi}^2 & i_{pfi}j_{pfi} & j_{pfi}^2 & 0 & 0 & 0 \\ 0 & 0 & 0 & i_{pfi}^2 & i_{pfi}j_{pfi} & j_{pfi}^2 \end{bmatrix} \tag{21}$$

$$A3_i=\begin{bmatrix} i_{pfi}^3 & i_{pfi}^2 j_{pfi} & i_{pfi}j_{pfi}^2 & j_{pfi}^3 & 0 & 0 & 0 & 0 \\ 0 & 0 & 0 & 0 & i_{pfi}^3 & i_{pfi}^2 j_{pfi} & i_{pfi}j_{pfi}^2 & j_{pfi}^3 \end{bmatrix} \tag{22}$$

Solving Equation (18) employing linear least squares produces the best fit grid parameters, p, in accordance with Equation (23) as set forth below:

$$p=(A^TA)^{-1}A^Ty. \tag{23}$$

Depending upon the accuracy of the estimates for $z_1$, $z_3$, $z_4$, and $Z_2$ used to solve Equation (13) for the coordinates of fiducials in fiducial space, it may be necessary to iterate between Equations (13) and (23) to arrive at a stable solution for p. In practice, this iterative process has been determined to converge very rapidly; two iterations may typically be sufficient for suitable convergence.

Figure 2:
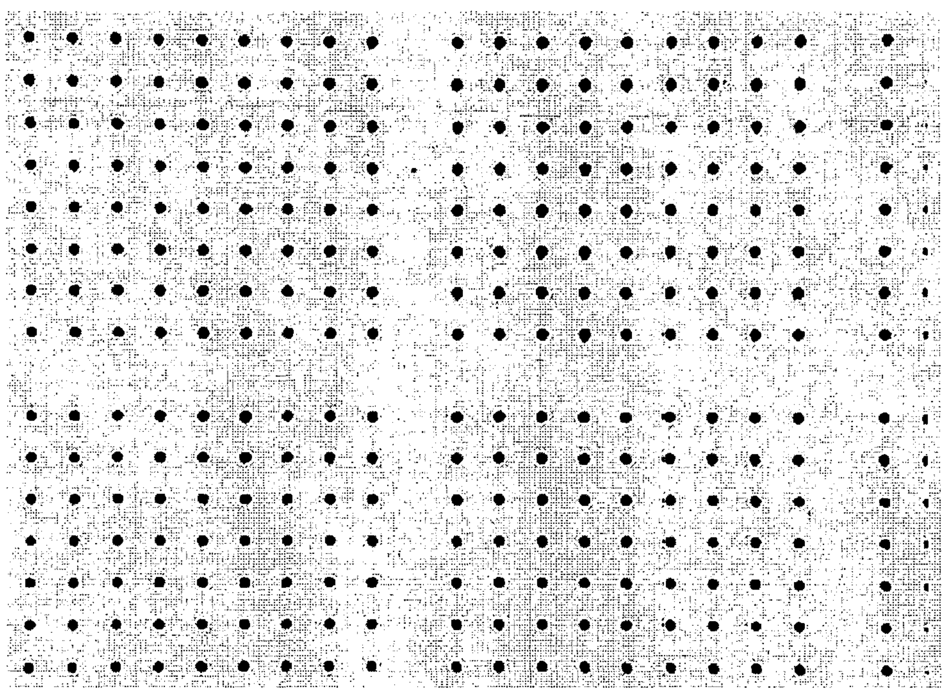
FIG. 2 is a simplified diagram depicting an exemplary set of fiducial locations derived from raw image data.
Figure 3:
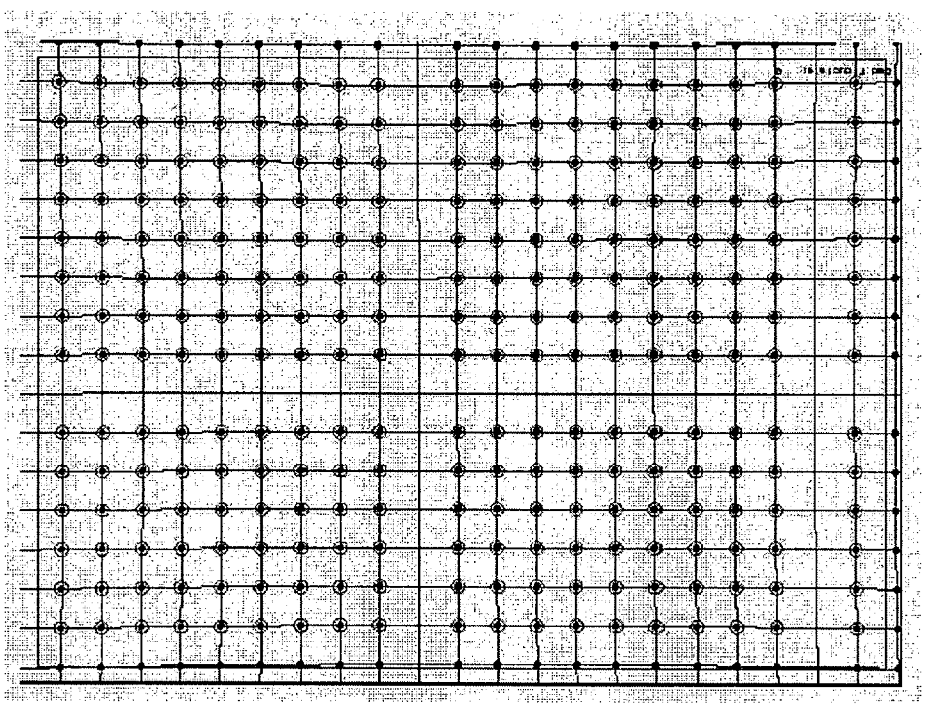
FIG. 3 is a simplified diagram illustrating image data processed in accordance with one embodiment of a fiducial fitting technique.

FIG. 2 is a simplified diagram depicting an exemplary set of fiducial locations derived from raw image data. In that regard, the fiducial locations illustrated in the FIG. 2 image are derived from the raw image data illustrated in FIG. 1. The result of applying the exemplary fiducial fitting technique set forth herein is illustrated in FIG. 3. Specifically, FIG. 3 is a simplified diagram illustrating image data processed in accordance with one embodiment of a fiducial fitting technique.

In the FIG. 3 illustration, fiducials are depicted as dark, filled dots, while each identified fiducial is indicated by the presence of an unfilled circle described around the respective dark dot. The network of intersecting lines in FIG. 3 represents lines of constant x and y in the fiducial coordinate system. Note that in the image pixel coordinate system, these "lines" appear distorted, and show significant keystone/barrel effects.

Fiducial Grid Model Inversion

As noted briefly above, inverting Equation (1) and (2) to solve for $i_p$ and $j_p$ corresponding to a desired camera pixel coordinate ($x_{cp}=x_{cpdes}$, $y_{cp}=y_{cpdes}$) may generally involve solving two non-linear equations in two unknowns. In one exemplary embodiment, the equations to be solved are set forth below:

$$x_{cp}=x_0+z_1i_p+z_3j_p+z_5t_p^{2}+z_6i_pj_p+z_7j_p^{2}+z_{11}i_p^{3}+z_{12}i_p^{2}j_p+z_{13}i_pj_p^{2}+z_{14}j_p^{3} \tag{24}$$

$$y_{cp}=y_0+z_4i_p+z_2j_p+z_8i_p^{2}+z_9i_pj_p+z_{10}j_p^{2}+z_{15}i_p^{3}+z_{16}i_p^{2}j_p+z_{17}i_pj_p^{2}+z_{18}j_p^{3}. \tag{25}$$

Typically the coefficients of the non-linear terms are very small, and an initial estimate of the linear coefficients may be calculated, for example, by assuming that these non-linear coefficients are zero. Under this assumption, $$A_{lin}=\begin{bmatrix} z_1 & z_3 \\ z_4 & z_2 \end{bmatrix} \quad y_{lin}=\begin{bmatrix} x_{cp_{des}}-x_0 \\ y_{cp_{des}}-y_0 \end{bmatrix} \quad p_{lin}=\begin{bmatrix} i_{p_{lin}} \\ j_{p_{lin}} \end{bmatrix} \tag{26}$$

and the linearized approximation, $p_{lin}$, may be solved through a simple matrix inversion $$p_{lin}=A_{lin}^{-1}y_{lin}. \tag{28}$$

This initial linear estimate for ($i_p$, $j_p$) may be used as a starting value for an iterative solution of non-linear Equations (24) and (25).

Conjugate Gradient Search

Alternatively, a non-linear least squares solution may be employed. The selected cost function to be minimized in this embodiment may be the square of the Euclidean distance between the desired camera coordinate ($X_{cpdes}$, $Y_{cpdes}$) and the model predicted camera coordinate ($x_{cp}$, $y_{cp}$). This cost function may be written as $$J=(x_{cp}-x_{cp_{des}})^2+(y_{cp}-y_{cp_{des}})^2. \tag{29}$$

The gradient of this cost function with respect to the fiducial coordinates i and j may be expressed as follows:

$$\frac{dx_{cp}}{di_p}=z_1+2i_pz_5+j_pz_6+3z_{11}i_p^2+2z_{12}i_pj_p+z_{13}j_p^2 \tag{30}$$

$$\frac{dy_{cp}}{di_p}=z_4+2i_pz_8+j_pz_9+3z_{15}i_p^2+2z_{16}i_pj_p+z_{17}j_p^2 \tag{31}$$

$$\frac{dx_{cp}}{dj_p}=z_3+i_pz_6+2j_pz_7+z_{12}i_p^2 2z_{13}i_pj_p+3z_{14}j_p^2 \tag{32}$$

$$\frac{dy_{cp}}{dj_p}=z_2+i_pz_9+2j_pz_{10}+z_{16}i_p^2+2z_{17}i_pj_p+3z_{18}j_p^2 \tag{33}$$

$$\frac{dJ}{di_p}=2(x_{cp}-x_{cp_{des}})\frac{dx_{cp}}{di_p}+2(y_{cp}-y_{cp_{des}})\frac{dy_{cp}}{di_p} \tag{34}$$

$$\frac{dJ}{dj_p}=2(x_{cp}-x_{cp_{des}})\frac{dx_{cp}}{dj_p}+2(y_{cp}-y_{cp_{des}})\frac{dy_{cp}}{dj_p} \tag{35}$$

Given the cost function and analytic gradients set forth in Equations (29) through (35), Equations (24) and (25) may be solved using any of a number of suitable conjugate gradient search algorithms. Given the typically good estimate provided by the approximate linear solution, the conjugate gradient search converges very quickly in practice (typically four iterations or fewer are sufficient for convergence).

Iterative Cubic Equation Solution

In another alternative embodiment, Equations (24) and (25) may be solved iteratively as cubic equations in i and j, respectively, substantially as set forth below. Rearranging terms:

$$z_{11}i_p^{3}+(z_5+z_{12}j_p)i_p^{2}+(z_1+z_6j_p+z_{13}j_p^{2})i_p+(x_0-x_{cp}+z_3j_p+z_7j_p^{2}+z_{14}j_p^{3})=0 \tag{36}$$

$$z_{18}j_p^{3}+(z_{10}+z_{17}j_p)j_p^{2}+(z_2+z_9i_p+z_{16}i_p^{2})j_p+(y_0-y_{cp}+z_4i_p+z_8i_p^{2}+z_{15}i_p^{3})=0. \tag{37}$$

Defining coefficients, Equations (36) and (37) become $$a_1i_p^{3}+b_1i_p^{2}+c_1i_p+d_1=0 \tag{38}$$

$$a_2j_p^{3}+b_2j_p^{2}+c_2i_p+d_2=0 \tag{39}$$

where $$a_1 \triangleq z_{11} \tag{40}$$

$$b_1 \triangleq z_5+z_{12}j_p \tag{41}$$

$$c_1 \triangleq z_1+z_6j_p+z_{13}j_p^2 \tag{42}$$

$$d_1 \triangleq x_0-x_{cp}+z_3j_p+z_7j_p^2+z_{14}j_p^3 \tag{43}$$

$$a_2 \triangleq z_{18} \tag{44}$$

$$b_2 \triangleq z_{10}+z_{17}i_p \tag{45}$$

$$c_2 \triangleq z_2+z_9i_p+z_{16}i_p^2 \tag{46}$$

$$d_2 \triangleq y_0-y_{cp}+z_4i_p+z_8i_p^2+z_{15}i_p^3 \tag{47}$$

Given the linear solution $p_{lin}$ from Equation (28) as a starting point, values may be assigned to $a_1$, $b_1$, and $c_1$ for an assumed $j_p$. Equation (38) may then be solved for $i_p$, and the root nearest $i_{plin}$ may be selected. Some methods may take this new value for $i_p$ and assign appropriate values to $a_2$, $b_2$, and $c_2$. Equation (39) may then be solved for $j_p$ and the root nearest $j_{plin}$ may be selected. The foregoing process may result in an improved solution estimate ($i_p$, $j_p$). The process may be iterated until the solution converges to a specified or predetermined tolerance. In practice, only three iterations are typically required for convergence to a point where the distance from the current estimate ($i_p$, $j_p$) to the previous estimate is less than $1\times10^{-6}$.

It will be appreciated that the foregoing functionality may be achieved, and that the equations set forth above may be solved or approximated, by suitable data processing hardware and software components generally known in the art and appropriately configured and programmed. Typical image acquisition systems employ such data processing hardware and attendant software, either of which may readily be updated, augmented, modified, or otherwise reprogrammed with computer executable instructions operative to cause the data processing hardware to compute solutions or approximations to the equations outlined above. Additionally, it will be apparent to those of skill in the art that the foregoing embodiments may be susceptible of various modifications within the scope and contemplation of the present disclosure. By way of example, the exemplary embodiments are not intended to be limited to any particular polynomial functions, for instance, or conjugate gradient search algorithms.

Aspects of the present invention have been illustrated and described in detail with reference to particular embodiments by way of example only, and not by way of limitation. It will be appreciated that various modifications and alterations may be made to the exemplary embodiments without departing from the scope and contemplation of the present disclosure. It is intended, therefore, that the invention be considered as limited only by the scope of the appended claims

What is claimed is:

1. A method of fitting acquired fiducial data to a set of fiducials on a fiducial plate; said method comprising:

translating an imaging apparatus and the fiducial plate relative to each other in a plane parallel fashion to capture image data having image features with an image feature center, the image features being positioned at discrete locations with respect to the set of fiducials on the fiducial plate;

mapping local frame fiducial coordinates to the image data captured by the imaging apparatus by at least in part calculating an absolute location for each captured image feature center relative to a corresponding fiducial on the fiducial plate in fiducial plate coordinates establishing a conversion from coordinates obtained from the image data to ideal fiducial coordinates using a data processing component, the establishing being based at least in part on the mapping of local frame fiducial coordinates to the image data and at least in part on estimating an inter-fiducial spacing of the image data using at least one of a predetermined fiducial pitch, a magnification of the imaging apparatus and a dimension of the image data;

employing a non-linear transformation to quantify at least one of independent scale factors in an X-Y plane, orthogonality errors in a camera pixel arrangement and a keystone distortion in the image data;

wherein based on the conversion using the data processing component, the absolute location indicating a distance measurement in fiducial plate coordinates; and based on at least one calculated absolute location of the identified acquired image feature centers, selectively modifying a structure represented by the identified acquired image feature center.

2. The method of claim 1 wherein said mapping comprises identifying fiducial coordinates for each fiducial captured in said image data acquired by said imaging apparatus.

3. The method of claim 2 further comprising selectively iterating said identifying coordinates for each fiducial and said calculating an absolute location of identified acquired image feature centers.

4. The method of claim 1 wherein said calculating comprises utilizing a linear least squares operation.

5. The method of claim 1 further comprising assuming that a rotation of said imaging apparatus relative to a fiducial grid is negligible.

6. The method of claim 1 wherein said imaging apparatus comprises a charge-coupled device camera.

7. The method of claim 1 wherein said imaging apparatus comprises a complementary metal-oxide semiconductor device.

8. A computer readable medium encoded with non-transitory data and instructions for fitting acquired fiducial data to a set of fiducials on a fiducial plate; said data and said instructions causing an apparatus executing said instructions to:

translate an imaging apparatus and the fiducial plate relative to each other in a plane parallel fashion to capture image data having image features with an image feature center, the image features being positioned at discrete locations with respect to the set of fiducials on the fiducial plate;

map local frame fiducial coordinates to the image data captured by the imaging apparatus by at least in part calculating an absolute location for each captured image feature center relative to a corresponding fiducial on the fiducial plate in fiducial plate coordinates;

establish a conversion from coordinates obtained from the image data of each identified fiducial to ideal plate coordinates, wherein the conversion is established based at least in part upon the map of local frame fiducial coordinates and at least in part on an estimate of an inter-fiducial spacing of the image data using at least one of a predetermined fiducial pitch, a magnification of the imaging apparatus and a dimension of the image date; and employ a non-linear transformation to quantify at least one of independent scale factors in an X-Y plane, orthogonality errors in a camera pixel arrangement and a keystone distortion in the image data;

wherein the absolute location indicating a distance measurement in fiducial plate coordinates.

9. The computer readable medium of claim 8 further encoded with data and instructions; said data and said instructions further causing an apparatus executing said instructions to identify fiducial coordinates for each fiducial captured in said data acquired by said imaging apparatus.

10. The computer readable medium of claim 9 further encoded with data and instructions; said data and said instructions further causing an apparatus executing said instructions selectively to iterate identifying coordinates for each fiducial and calculating an absolute location of identified acquired image feature centers.

11. The computer readable medium of claim 8 further encoded with data and instructions; said data and said instructions further causing an apparatus executing said instructions to utilize a linear least squares operation.

12. The computer readable medium of claim 8 further encoded with data and instructions; said data and said instructions further causing an apparatus executing said instructions to assume that a rotation of said imaging apparatus relative to a fiducial grid is negligible.

13. A method of accurately identifying a location of a feature relative to a fiducial plate comprising:

acquiring an image data of an object with an imaging apparatus by translating the imaging apparatus and a fiducial plate relative to each other in a plane parallel fashion to capture the image data at discrete locations, the image data concerning the position of a plurality of fiducial marks on a fiducial plate and data concerning the position of a feature of the object, the image data being acquired such that the image data concerning the position of a plurality of fiducial marks on a fiducial plate and data concerning the position of a feature of the object is obtained simultaneously, wherein the image data represent the fiducial marks as having a center;

mapping local frame fiducial coordinates to the image data captured by the imaging apparatus by at least in part calculating an absolute location for each captured fiducial mark center relative to a corresponding fiducial on the fiducial plate in fiducial plate coordinates;

establishing a conversion from coordinates of the plurality of fiducial marks acquired from the image to coordinates of the plurality of fiducial marks on the fiducial plate using a data processing component, the establishing begin based at least in part on the mapping of local frame fiducial coordinates to the image data and at least in part on estimating an inter-fiducial spacing of the image data using at least one of a predetermined fiducial pitch, a magnification of the imaging apparatus and a dimension of the image data;

employing a non-linear transformation to quantify at least one of independent scale factors in an X-Y plane, orthogonality errors in a cameral pixel arrangement and a keystone distortion in the image data;

wherein the absolute location indicating a distance measurement in fiducial plate coordinates; and determining a position of a feature of the object in the captured image and modifying the determined position based on at least one calculated absolute location of the plurality of fiducial marks in the acquired image.

14. The method of claim 13 wherein the mapping comprises identifying fiducial mark coordinates for each fiducial mark captured in the image data acquired by the imaging apparatus.

15. The method of claim 14 further comprising selectively iterating the identifying coordinates for each fiducial mark and the calculating an absolute location of identified acquired image feature centers.

16. The method of claim 13 wherein the calculating comprises utilizing a linear least squares operation.

17. The method of claim 13 further comprising assuming that a rotation of the imaging apparatus relative to the fiducial plate is negligible.

18. The method of claim 13 wherein the imaging apparatus comprises a charge coupled device camera.

19. The method of claim 13 wherein the imaging apparatus comprises a complementary metal-oxide semiconductor device.

20. The method of claim 13 wherein the object is part of a semiconductor probe card.

21. A method of localizing an object, comprising:

acquiring an image data with an imaging apparatus by translating the imaging apparatus and a fiducial plate relative to each other in a plane parallel fashion to capture the image data having image features with an image feature center, the image features being positioned at discrete locations with respect to corresponding fiducials on the fiducial plate, wherein the discrete locations are less than or equal to half of a center-to-center fiducial spacing as measured on the fiducial plate, the image data including the object to be localized and a plurality of fiducial marks;

mapping local frame fiducial coordinates to the image data captured by the imaging apparatus by at least in part calculating an absolute location for each captured image feature center relative to a corresponding fiducial on the fiducial plate in fiducial plate coordinates;

determining an actual position of the object with respect to the plurality of fiducial marks using the model fitted to the image of the plurality of fiducial marks as the imaging apparatus is translated, including:

establishing a conversion from coordinates obtained from the image data to ideal fiducial coordinates based at least in part on the mapping of local frame fiducial coordinates to the image data and at least in part on estimating an inter-fiducial spacing of the image data using at least one of a predetermined fiducial pitch, a magnification of the imaging apparatus and a dimension of the image data, employing a non-linear transformation to quantify at least one of independent scale factors in an X-Y plane, orthogonality errors in a camera pixel arrangement and a keystone distortion in the image data.

22. The method of claim 21 further comprising:

interposing a substantially transparent substrate having a plurality of fiducials formed therein between the imaging apparatus and the object.

23. The method of claim 21 further comprising:

acquiring a succession of images with an imaging apparatus, each of the succession of images including both the object and the plurality of fiducial marks.

24. The method of claim 1, wherein the image data includes object data and fiducial data.

* * * * *

UNITED STATES PATENT AND TRADEMARK OFFICE

CERTIFICATE OF CORRECTION

PATENT NO. : 8,428,393 B2
APPLICATION NO. : 10/800420
DATED : April 23, 2013
INVENTOR(S) : Raymond H. Kraft It is certified that error appears in the above-identified patent and that said Letters Patent is hereby corrected as shown below:

Title Page, Col. 2 (OTHER PUBLICATIONS), line 2, delete "spetmeber" and insert --September--.

In the Specification

Column 7, line 6, delete

" $x_{cp}=x_0+z_1 i_p+z_3 j_p+z_5 t_p^2+z_6 i_p j_p+z_7 j_p^2+z_{11} i_p^3+z_{12} i_p^2 j_p+z_{13} i_p j_p^2+z_{14} j_p^3$ "

and insert in place thereof

-- $x_{cp}=x_0+z_1 i_p+z_3 j_p+z_5 i_p^2+z_6 i_p j_p+z_7 j_p^2+z_{11} i_p^3+z_{12} i_p^2 j_p$
$+z_{13} i_p j_p^2+z_{14} j_p^3$ --.

Column 9, line 6, after "claims" insert --.--.

Signed and Sealed this
Twenty-second Day of October, 2013

Teresa Stanek Rea
*Deputy Director of the United States Patent and Trademark Office*